US009788263B1

(12) United States Patent
Amiri et al.

(10) Patent No.: US 9,788,263 B1
(45) Date of Patent: Oct. 10, 2017

(54) WIFI CLIENT WITH HYBRID COMMUNICATION CAPABILITIES FOR WIRELESS LOCAL AREA NETWORK

(71) Applicant: Quantenna Communications, Inc., Fremont, CA (US)

(72) Inventors: Bahador Amiri, Los Gatos, CA (US); Ramanujam Jagannath, Cupertino, CA (US); Dapeng Mi, Wuxi Jiangsu Province (CN); Hossein Dehghan, Diablo, CA (US); Bo Zhao, Suzhou (CN); Sunil F. Assao, Fremont, CA (US)

(73) Assignee: Quantenna Communications, Inc., Fremont, CA (US)

( * ) Notice: Subject to any disclaimer, the term of this patent is extended or adjusted under 35 U.S.C. 154(b) by 0 days.

(21) Appl. No.: 14/624,546

(22) Filed: Feb. 17, 2015

Related U.S. Application Data

(60) Provisional application No. 61/940,424, filed on Feb. 15, 2014.

(51) Int. Cl.
*H04W 48/16* (2009.01)
*H04W 72/04* (2009.01)
*H04W 84/12* (2009.01)

(52) U.S. Cl.
CPC .......... *H04W 48/16* (2013.01); *H04W 72/04* (2013.01); *H04W 84/12* (2013.01)

(58) Field of Classification Search
CPC ...... H04W 48/16; H04W 72/04; H04W 84/12
See application file for complete search history.

(56) References Cited

U.S. PATENT DOCUMENTS

| 8,634,434 | B2 | 1/2014 | Heidari et al. | |
|---|---|---|---|---|
| 9,332,554 | B1 | 5/2016 | Heidari | |
| 2008/0227484 | A1* | 9/2008 | Auvray | H04L 69/329 455/552.1 |
| 2009/0225658 | A1 | 9/2009 | Rezvani et al. | |
| 2010/0195569 | A1* | 8/2010 | Matsushita | H04B 3/54 370/328 |
| 2011/0292799 | A1* | 12/2011 | Dottling | H04L 47/10 370/235 |
| 2015/0327265 | A1* | 11/2015 | Lee | H04W 72/0446 370/311 |

* cited by examiner

*Primary Examiner* — Walter Divito
(74) *Attorney, Agent, or Firm* — IP Creators; Charles C. Cary

(57) ABSTRACT

A hybrid wireless client apparatus including: a hybrid client controller, at least one antenna, and a plurality of shared and discrete components coupled to one another to form at least one transmit and receive chain each coupled to the at least one antenna for orthogonal frequency division multiplexed (OFDM) wireless communications with a wireless access point (WAP). The hybrid client controller is coupled to the plurality of shared and discrete components and configured to determine an eligibility of at least one neighboring wireless client node on a wireless local area network (WLAN) as a relay target, and responsive to an affirmative eligibility determination to initiate on the hybrid wireless client apparatus both local communications with the WAP together with a relay of distinct communications between the WAP and the at least one neighboring wireless client node as the relay target.

4 Claims, 4 Drawing Sheets

Hybrid Client in WiFi Home Network

Wireless Home Network With Hybrid Client(s) for Improved WLAN Coverage

FIG. 2A Hybrid Client:Evaluating Relay Candidate

FIG. 2C Hybrid Client:Supporting Hybrid Communications

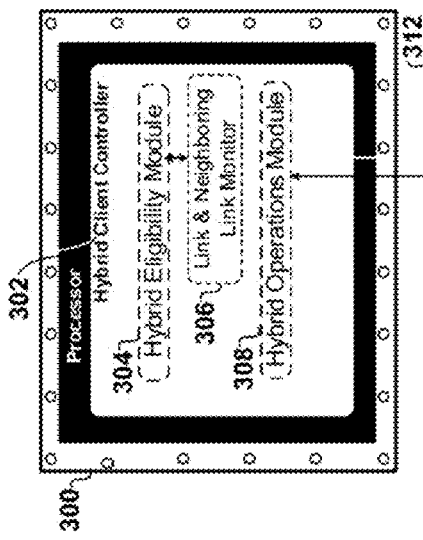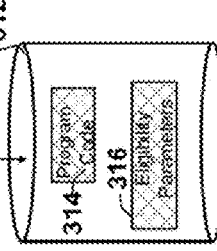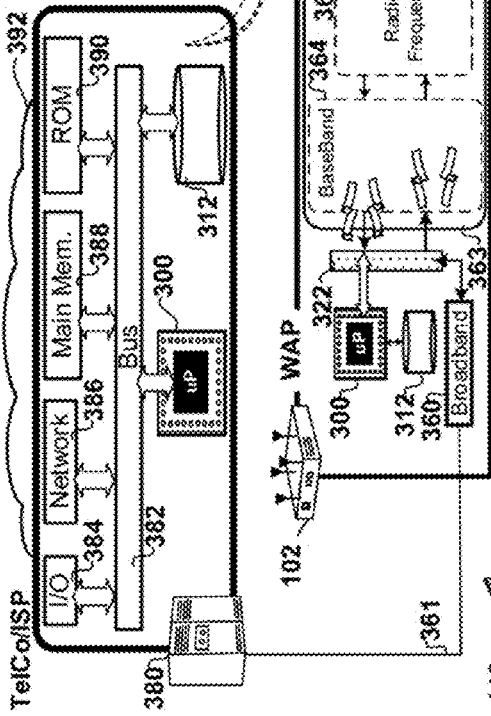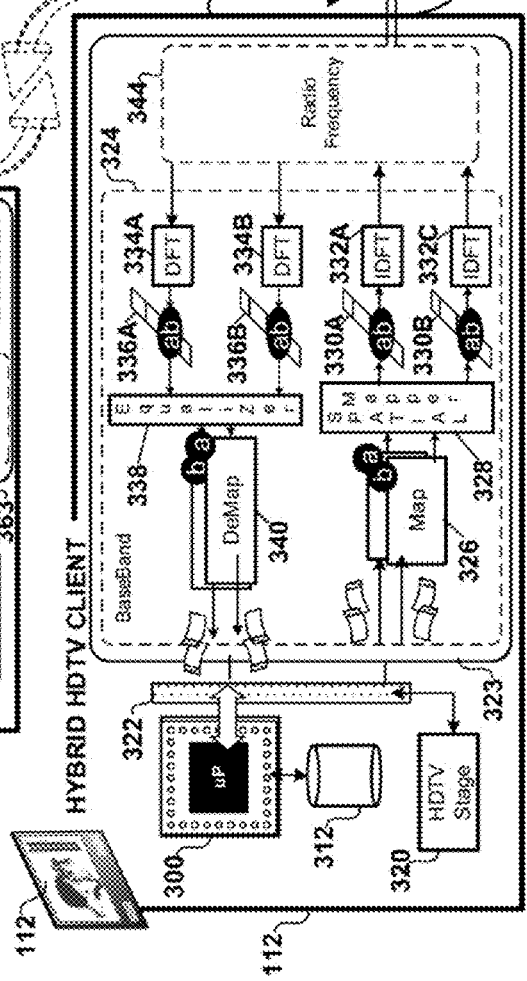

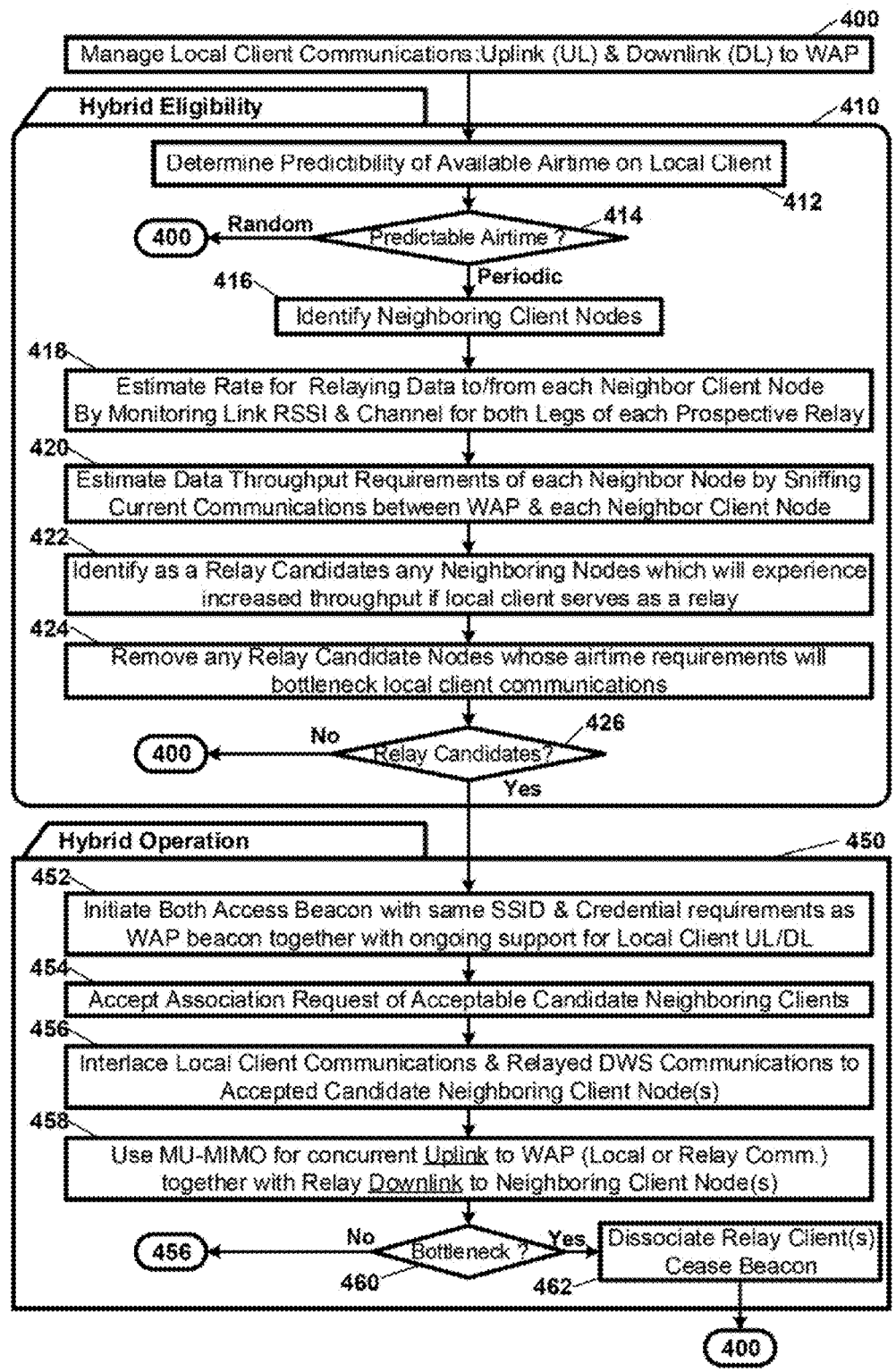
FIG. 4  Hybrid Client in WiFi Home Network

WIFI CLIENT WITH HYBRID COMMUNICATION CAPABILITIES FOR WIRELESS LOCAL AREA NETWORK

CROSS REFERENCE TO RELATED APPLICATION

This application claims the benefit of prior filed Provisional Application No. 61/940,424 filed on Feb. 15, 2014 entitled "Method and Apparatus for Smart Wireless Repeater Design" which is incorporated herein by reference in its entirety as if fully set forth herein.

BACKGROUND OF THE INVENTION

1. Field of Invention

The field of the present invention relates in general to wireless local area networks including wireless access points (WAP) and wireless stations and methods for operation of same.

2. Description of the Related Art

Home and office networks, a.k.a. wireless local area networks (WLAN) are established using a device called a Wireless Access Point (WAP). The WAP may include a router. The WAP wirelessly couples all the client devices of the home network, e.g. wireless clients such as: computers, printers, televisions, set top boxes, wireless HDTV dongles, digital video (DVD) players, security cameras and smoke detectors to one another and to the Cable or Subscriber Line through which Internet, video, and television is delivered to the home. Most WAPs implement the IEEE 802.11 standard which is a contention based standard for handling communications among multiple competing devices for a shared wireless communication medium on a selected one of a plurality of communication channels. The frequency range of each communication channel is specified in the corresponding one of the IEEE 802.11 protocols being implemented, e.g. "a", "b", "g", "n", "ac", "ad". Communications follow a hub and spoke model with a WAP at the hub and the spokes corresponding to the wireless links to each 'client' device, a.k.a. client node.

After selection of a single communication channel for the associated home network, access to the shared communication channel requires an association request by each client device to the WAP.

Communications on the single communication medium are identified as "simplex" meaning, one or more communication streams from a single source node to one or more target nodes at one time, with all remaining nodes capable of "listening" to the subject transmission. WLAN access by associated client nodes relies on a multiple access methodology identified as Collision Sense Multiple Access with Collision Avoidance (CSMA\CA). CSMA\CA is a distributed random access methodology first introduced for home wired networks such as Ethernet for sharing a single communication medium, by having a contending communication link back off and retry access to the line if a collision is detected, i.e. if the wireless medium is in use.

What is needed are improved methods for communications on a wireless home network.

SUMMARY OF THE INVENTION

The present invention provides a method and apparatus for operating a hybrid wireless client node in a manner which improves the performance of a wireless local area network (WLAN).

In an embodiment of the invention a hybrid wireless client apparatus for joining a wireless local area network (WLAN) is disclosed. The hybrid wireless client apparatus includes: a hybrid client controller, at least one antenna, and a plurality of shared and discrete components coupled to one another to form at least one transmit and receive chain each coupled to the at least one antenna for orthogonal frequency division multiplexed (OFDM) communications with a wireless access point (WAP). The hybrid client controller is coupled to the plurality of shared and discrete components and configured to determine an eligibility of at least one neighboring wireless client node as a relay target, and responsive to an affirmative eligibility determination to initiate on the hybrid wireless client apparatus both local communications with the WAP together with a relay of distinct communications between the WAP and the at least one neighboring wireless client node as the relay target.

The invention may be implemented in hardware, firmware or software.

Associated methods are also claimed.

BRIEF DESCRIPTION OF THE DRAWINGS

These and other features and advantages of the present invention will become more apparent to those skilled in the art from the following detailed description in conjunction with the appended drawings in which:

FIGS. 2A, 2C and FIGS. 2B, 2D are plan views and timing diagrams respectively of the operation of the WLAN shown in FIG. 1 including the operation of the hybrid wireless client in accordance with an embodiment of the invention;

FIGS. 3A-D are hardware block diagrams of various devices configured to execute the hybrid wireless client in accordance with an embodiment of the current invention; and FIG. 4 is a process flow diagram of processes associated with the hybrid wireless client in accordance with an embodiment of the current invention.

DETAILED DESCRIPTION OF THE EMBODIMENTS

The present invention provides a method and apparatus for operating a hybrid wireless client node in a manner which improves the performance of a wireless local area network (WLAN) for the homeowner, and assures that the Internet Service Provider (ISP), Telco or Cable Operator can meet service level agreements (SLA) for the homeowner subscriber.

Figure 1:
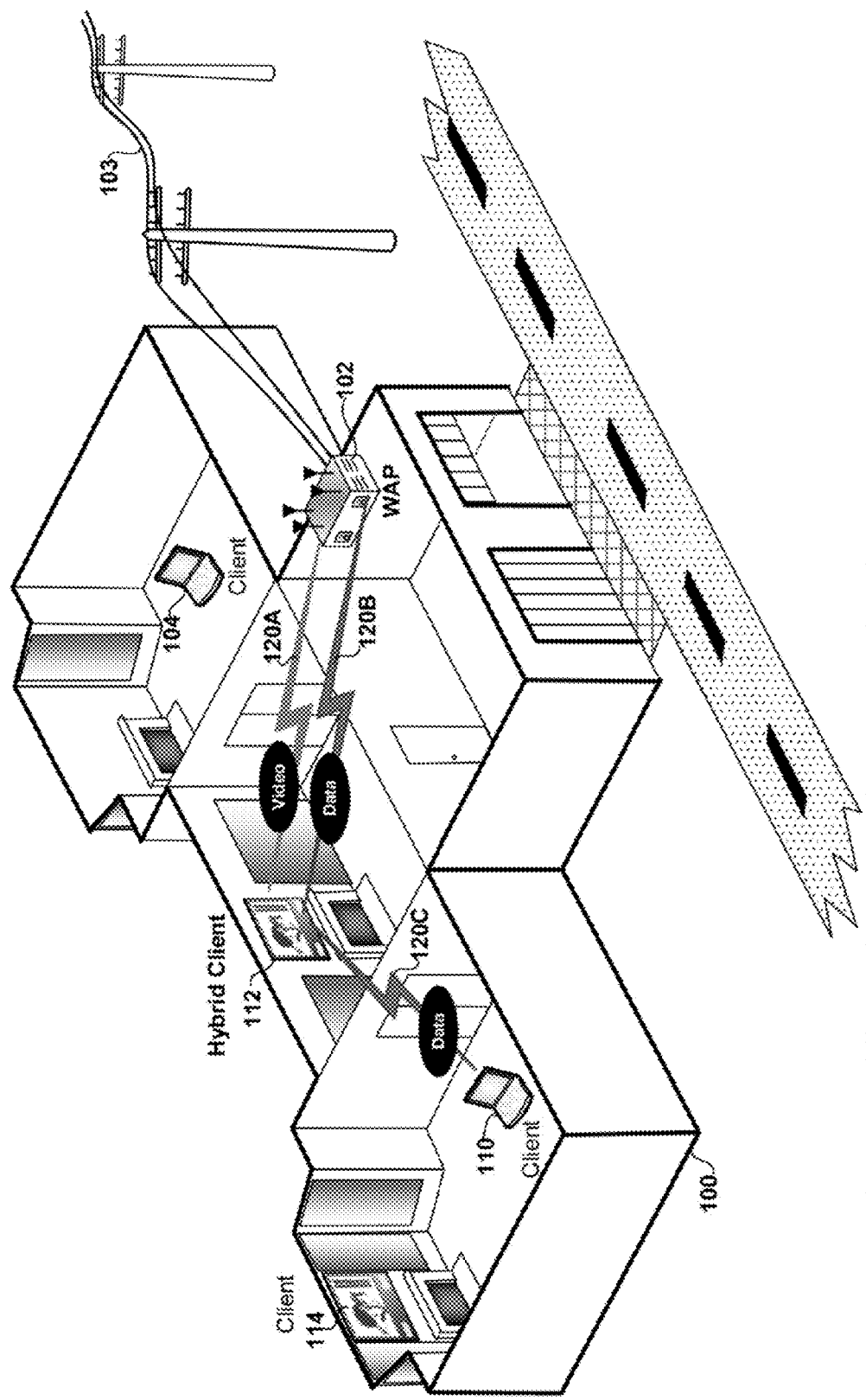
FIG. 1 is an isometric view of a home with a wireless local area network (WLAN) provided by a wireless access point (WAP) and associated client nodes at least one of which is a hybrid wireless client in accordance with an embodiment of the invention.

FIG. 1 is an isometric view of a home 100 with a wireless local area network (WLAN) provided by a wireless access point (WAP) 102 and associated client nodes 104, 110, 112, 114, at least one of which, e.g. client node 112 is a hybrid wireless client node in accordance with an embodiment of the invention. The WAP 102 provides broadband access over Telco infrastructure, e.g. Telephone lines 103 to the Internet. The client nodes, include for example wireless: computers, printers, televisions, set top boxes, wireless HDTV dongles, digital video (DVD) players, security cameras and smoke detectors. Each couples via the WAP to the Internet. The WAP implements the IEEE 802.11 standard which is a contention based standard for handling communications among multiple competing devices for a shared wireless communication medium on a selected one of a plurality of communication channels. The frequency range of each communication channel is specified in the corresponding one of the IEEE 802.11 protocols being implemented, e.g. "a", "b", "g", "n", "ac", "ad". Communications follow a hub and spoke model with a WAP at the hub and the spokes corresponding to the wireless links to each 'client' device, a.k.a. client node. There are limits to the ability of a single WAP to reach all client nodes in the home. The current invention provides a method and apparatus for providing wireless access to all remote or 'hidden' client nodes in the home. Specifically, one or more client nodes are configured to implement hybrid client capabilities. A hybrid client, is a client that can toggle intelligently between dedicated local mode in which only local communications between the client and the WAP are supported and hybrid mode in which both local communications between the hybrid client and the WAP together with relayed communications to a selected neighboring client node are managed by the hybrid client. In FIG. 1, wireless hybrid HDTV client node includes the aforesaid hybrid mode capability. In operation, the hybrid wireless HDTV performs as a typical HDTV handling only local communications between itself and the WAP, e.g. accepting a downlink of streaming video over link 120A from WAP 102. If the hybrid wireless HDTV determines both that it has available airtime above and beyond that required to support local communications, and further that a neighboring client node, e.g. wireless notebook computer 110 is not properly serviced by the WAP, then the HDTV transitions to hybrid mode. In hybrid mode the hybrid wireless HDTV continues to handle local communications, e.g. the downlink of streaming video on link 120A for display on its TV screen, and additionally takes on the task of relaying communications over links 120B-120C between the WAP and the neighboring client node 110. If at any time the relayed communications threaten to bottleneck or disrupt normal local communications, the HDTV terminates the relay communications to the target client 110, and resumes operation in local mode, handling only local communications between it and the WAP.

FIGS. 2A, 2C and FIGS. 2B, 2D are plan views and timing diagrams respectively of the operation of the WLAN shown in FIG. 1 including the operation of the hybrid wireless client in accordance with an embodiment of the invention.

FIG. 2A is a plan view of home 100 at the onset of evaluation by the hybrid wireless HDTV client 112. The hybrid client node 112 evaluates its own local airtime requirements as determined by the percentage of time in any given time interval required to support existing local communications, i.e. uplink/downlink 202, a.k.a. link "A". The hybrid client node then identifies a prospective relay target client node, e.g. client node 110. The hybrid client evaluates the relay links required to service client node 110. The characteristics of one of the prospective relay links between the hybrid wireless client and the WAP is already well known given the performance of link 202 in terms of: received signal strength indicator (RSSI), optimal modulation and coding schema (MCS) and or channel matrix "H". The hybrid client also evaluates the prospective relay link 210B between it and the target client node 110 by determining the channel "H" or isotropic signal strength 210A of any "Probe" packets, uplink communication packets 208B or acknowledgement "ACK" packets sent by client node 110 to the WAP, all of which can be "heard" by the hybrid wireless client 112. Finally, during intervals of network activity in which client 110 and WAP 102 are exchanging uplink packets 2086 or downlink packets 208A on link 206, a.k.a. "B", the hybrid client "sniffs" the packets for payload size, type and duration and determines therefrom the data throughput requirements and quality of service (QOS) levels required to support communications with client node 110.

In an alternate embodiment of the invention the WAP 102 aggregates the data throughput and QOS requirements for the client node 110 and provides this eligibility data to the hybrid wireless client node 112. In still another embodiment of the invention the WAP identifies the client node 110 as a relay candidate for the hybrid wireless client 112 based on throughput limitations of link 206. The WAP provides this eligibility data to the hybrid wireless client node 112.

Figure 2B:
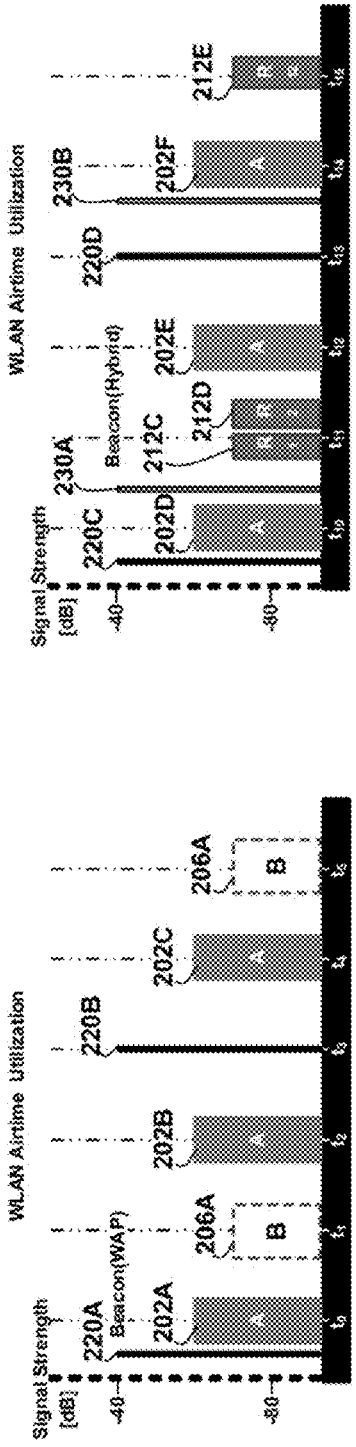
Figure 2B:
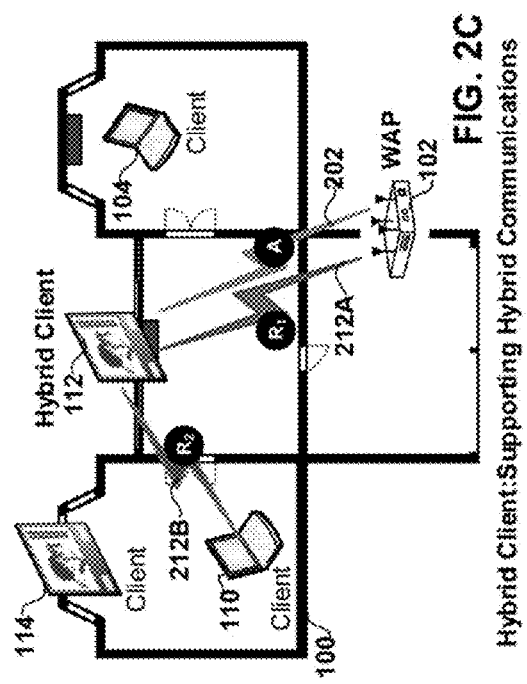

FIG. 2B is a graph showing signal strength and signal timing of WLAN operation over the rolling history interval from $t_0$-$t_5$ as shown in FIG. 2A. The periodic beacons 220A-B sent by WAP 102 are shown. Each beacon identifies the WAP by service set identifier (SSID) and by capabilities. Local communications 202A-C between the WAP and the hybrid wireless client node 112 over link "A" a.k.a. 202, are shown occurring at times $t_0$, $t_2$, and $t_4$. Local Communications 206A-B between the WAP and the wireless client node 110 over link "B" a.k.a. 206, are shown occurring at times $t_1$, $t_5$. Hybrid Client node 112 is able to sniff these local communications over link "B" as discussed above to determine the data throughput requirements for the target relay client node 110, and the qualities of the prospective link 210B between it and the target relay client node.

In an alternate embodiment of the invention some or all of the eligibility data used in the hybrid client's evaluation phase may alternately be determined by the WAP or by the WAP in conjunction with a Telco or other "cloud" based server and conveyed back to the hybrid client node either as eligibility data from which a target relay client node determination can be made, or with the actual identification/designation of the target relay client node provided by the WAP or "cloud" based server.

FIG. 2C is a plan view of home 100 at the onset of hybrid communications by the hybrid wireless HDTV client 112. The client 110 no longer has a link with WAP 102, having disassociated from that WAP. Rather the communications between the target relay client node 110 and the WAP 102 are accomplished via relay links 212A-B, a.k.a. $R_1$-$R_2$ between the WAP 102 and the hybrid client 112 and between the hybrid client 112 and the target relay client node 110 respectively. Additionally, the hybrid relay client node 112 continues to support local communications, e.g. the downlinks and uplinks associated with streaming video over link 202, a.k.a. "A". The hybrid client node continuously evaluates the quality of its local communication link 202 and terminates the relay links 212A-B when and if they threaten to bottleneck the local communication link 202, and disrupt the associated HDTV content delivery.

Figure 2D:
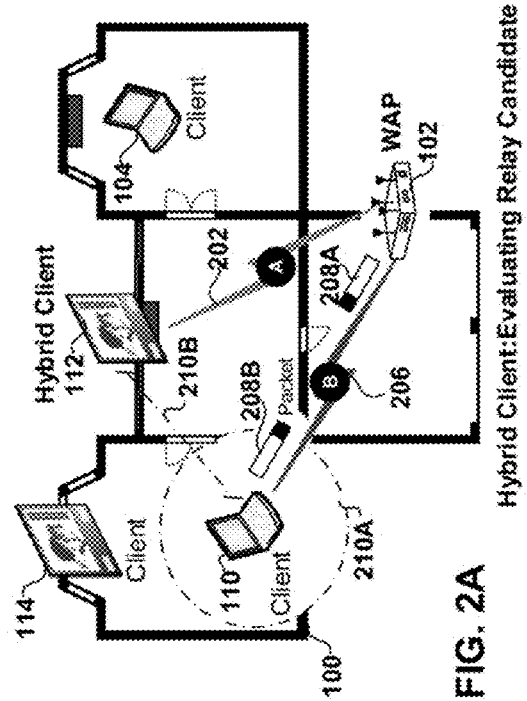

FIG. 2D is a graph showing signal strength and signal timing of WLAN operation over the rolling history interval from $t_{10}$-$t_{15}$ as shown in FIG. 2C. During this interval the hybrid wireless client node, supports hybrid communications, i.e. local communication between itself and the WAP together with the relay of communications between the client node 110 and the WAP 102. The WAP 102 continues to periodically transmit its beacons 220C-D. Each beacon identifies the WAP by service set identifier (SSID) and by capabilities. Additionally, the hybrid wireless client node 112 also transmits periodically its own beacons 230A-B with the same SSID and credential requirements as the WAP, e.g.

a shared key. Local communications 202D-F between the WAP and the hybrid wireless client node 112 over link "A" a.k.a. 202, are shown occurring at times $t_{10}$, $t_{12}$, and $t_{14}$.

The hybrid wireless client accepts an association request from client node 110, and establishes the relay links over which subsequent communications will be conducted using the wireless distributed service (WDS) protocol as specified in the IEEE 802.11 standard. The WDS protocol specifies four addresses in each packet, i.e. a destination Address, a source address, a receiver address and a transmitter address. The source and destination addresses specify the original sender and the final receiver, i.e. the target relay client node, respectively. The transmitter and receiver addresses specify the current transmitter and receiver of the packet. These relayed communications 212C-212D are shown occurring sequentially one after another around time $t_{11}$.

Starting at time $t_{15}$, concurrent communications 212E on links R1 and R2, a.k.a. 212A and 212B respectively are shown. Such concurrency reduces the airtime requirements associated with relayed communications by bundling an uplink on link 212A from the hybrid wireless client node 112 to the WAP 102 together with a downlink on link 212B from hybrid client node 112 to target relay client node 110. In this embodiment of the invention the hybrid wireless client supports multi-user multiple-input multiple-output (MU-MIMO) communications with the concurrent links including either or both relayed content or a mix of relayed and local content. As an example of the latter, the hybrid wireless client node may concurrently transmit relayed data on the downlink 212B to target relay client node 110 together with either or both relayed communications from client node 110 or local communications from the hybrid client itself on the uplink 212A or 202 to the WAP 102.

FIGS. 3A-D are hardware block diagrams of various devices configured to execute the hybrid wireless client in accordance with an embodiment of the current invention;

FIG. 3A shows a processor 300 and memory element or storage module 312 configured to execute program code 314 to instantiate the hybrid client controller module 302. The program code may be configured to run on a single device or cooperatively on one or more host devices. The hybrid client controller module includes: a hybrid eligibility module 304, a link and neighboring link monitor 306 and a hybrid operations module 308. In addition to program code, the storage element 312 includes: eligibility parameters and data 316 aggregated from the WLAN.

In operation the hybrid eligibility module determines airtime availability and predictability of the hybrid client node as well as neighboring nodes to the hybrid client node. In addition the hybrid eligibility module identifies as potential relay targets those neighboring nodes which are prospective candidates for relayed communications based the throughput requirements of each and the transport capability of the associated relay links as determined by the channel information from the link and neighboring link monitor. Channel information includes: received signal strength indicator (RSSI), modulation and coding schema (MCS), packet error rate (PER), and channel matrix "H" for example. This data is processed and the resultant eligibility data/parameters are stored in memory element 316.

The hybrid operations module handles the generation of a beacon on the hybrid client node, the association and dissociation of the targeted relay client node(s), and the interlacing of local and relayed communications on the hybrid client node. In an embodiment of the invention where the hybrid client node includes MU-MIMO capability, the hybrid operations module manages the concurrent uplink of local or relayed communications from the hybrid client node to the WAP together with the downlink of relayed communications to the target client node.

FIG. 3B shows a hybrid wireless HDTV client 112 configured as a host device and joining a WLAN 348 which includes other wireless client nodes, e.g. wireless notebook computer 110, all which are serviced by WAP 102. The hybrid wireless HDTV client handles the download and decoding of video content delivered from a provider and wirelessly distributed within the home by the WAP 102 for display on the associated screen of the HDTV. The hybrid wireless HDTV client in this embodiment of the invention has WiFi capabilities identified as a 2×2 wireless stage supporting as many as 2 discrete MIMO communication streams "a", "b" over its two antennas 346. The hybrid wireless HDTV client includes: the processor 300 and storage 312; an HDTV stage 320, and the aforementioned WiFi stage 323 coupled via bus 322 to one another. The HDTV stage 320 includes a video decoder, and display driver for example. The WiFi stage 323 includes: a base band stage 324, a radio frequency (RF) stage 344 and one or more antennas, e.g. antennas 346. The RF stage supports one or more IEEE 802.11 wireless local area network (WLAN) protocols. The processor in addition to supporting the IEEE 802.11 WiFi client functionality also executes the program code which provides hybrid client controller functionality as discussed in connection with FIG. 3A. In an embodiment of the invention, the hybrid wireless client node, e.g. hybrid HDTV wireless client node, performs all functions associated with hybrid client behavior on its own. These hybrid wireless client functions include: determining its own available airtime and the predictability of same; evaluating neighboring wireless nodes as prospective relay candidates and establishing where practicable, hybrid communications including both local communications as well as relayed communications to an acceptable relay candidate.

In the baseband stage 324 transmitted communications for the WAP are encoded and scrambled. Each stream "a", "b" is subject to interleaving and constellation mapping in an associated interleaver mapper 326 and passed to the spatial mapper 328. The spatial mapper uses a beamsteering matrix steer uplink 350 local communications and or uplink 352A relay communications to the WAP 102 and or downlink 352B relay communications to the relay target node, e.g. notebook computer 110. The beamsteering matrix specifies specific phase and amplitude adjustments for the communications on each antenna designed to steering the outgoing communications toward the recipient WAP or target relay client node. The combined streams "ab" are injected into each of the orthogonal frequency division multiplexed (OFDM) tones or sub-channels 330A-B of the inverse discrete Fourier Transform (IDFT) modules 332A-B respectively. Each IDFT module is coupled via associated upconversion circuitry in the RF stage 344 to an associated one of the pair of antenna 346.

In the RF Stage 344 received local or relayed communications "ab" on each of the two antenna 346 from either the target relay client node 110 on link 352B or the WAP on links 350 or 352A are downconverted and supplied as input to the baseband stage 324. In the baseband stage the received communications are then transformed from the time to the frequency domain in the discrete Fourier Transform (DFT) modules 334A-B from which they are output as discrete orthogonal frequency division multiplexed (OFDM) tones/ sub-carriers/sub-channels 336A-B. All received streams are then subject to equalization in equalizer 338. Received steams "ab" are subject to de-interleaving and constellation demapping in associated deinterleaver demapper modules 340, followed by any required decoding and descrambling.

FIG. 3C shows the wireless access point (WAP) 102 configured as a host device for servicing the WLAN 348 which includes the wireless client nodes, e.g. wireless notebook computer 110, and hybrid wireless HDTV client node 112. The WAP handles the coupling of each of the client nodes to the Internet 392, via a broadband module 360 and a wired broadband connection, e.g. cable or telephone wire 361, to the Telco or Internet Service Provider's server(s) 380. The WAP supports discrete communications with each client node on the WLAN. The WAP 102 in this embodiment of the invention is identified as a 4×4 WAP supporting as many as 4 discrete communication streams "a", "b", "c", "d" over four antennas 368. The WAP 102 includes: the processor 300 and memory element 312; a bus 322, a WLAN stage 363 including a base band stage 364, a radio frequency (RF) stage 366 and antennas 368. The WAP RF stage supports one or more IEEE 802.11 wireless local area network (WLAN) protocols. The WAP also includes a broadband interface 360, e.g. cable or Digital Subscriber Line (DSL) modem, for coupling via copper or fiber 361 to a Telco or Internet Service Provider (ISP) 380. The processor in addition to supporting the IEEE 802.11 WiFi client functionality also executes the program code which provides in this embodiment of the invention, a portion of hybrid client controller functionality as discussed in connection with FIG. 3A. In this embodiment of the invention, the hybrid wireless client node, e.g. hybrid HDTV wireless client node, does not perform all functions associated with hybrid client behavior on its own. Evaluation of neighboring wireless nodes their requirements and capabilities and the eligibility of one or more as candidate target relay client nodes may be performed in cooperation with the WAP 102 or in cooperation with the WAP and a cloud server, e.g. server 380 without departing from the scope of the claimed invention. Additionally, once a target wireless relay node is identified, the WAP may dissociate the target wireless relay node, thereby allowing it to re-associate with the hybrid wireless client node. After the eligibility determinations have been made the hybrid wireless client node will establish where practicable, hybrid communications including both local communications as well as relayed communications to an acceptable relay candidate.

FIG. 3D shows a Telco or ISP having a server 380 configured as a host device and coupled to the Internet 392. The server includes the processor 300 and memory element or storage 312; a bus 382, an input/output (I/O) module 384 for interfacing with a user, a network module 386 for coupling to a network, a main memory 388 for storing and executing program code and data, a read only memory (ROM) 390 for storing bootup program code. The processor in addition to supporting the server functionality also executes the program code which provides a portion of the hybrid client control functionality as discussed in connection with FIG. 3A. In this embodiment of the invention, the hybrid wireless client node, e.g. hybrid HDTV wireless client node, does not perform all functions associated with hybrid client behavior on its own. Evaluation of neighboring wireless nodes their requirements and capabilities and the eligibility of one or more as candidate target relay client nodes may be performed in cooperation with the WAP 102 without departing from the scope of the claimed invention. After the eligibility determinations have been made the hybrid wireless client node will establish where practicable, hybrid communications including both local communications as well as relayed communications to an acceptable relay candidate.

FIG. 4 is a process flow diagram of processes associated with the hybrid wireless client in accordance with an embodiment of the current invention. Processing begins in process 400 with the management of local communications between the hybrid wireless client node and the WAP. Where the hybrid wireless client node comprises an HDTV, such local communications include downlink from the WAP of the streaming video content from a content provider, and uplinks to the WAP of video content selection information from the user to select a new video from the content provider. Next control is passed to the block of processes 410 associated with determining hybrid client eligibility.

Hybrid eligibility processing commences with process 412 in which a determination is made as to the amount of available airtime on the local wireless client node and the predictability of that available airtime. That determination may be based on a rolling history of local communications on the client node. Such determination can be made on the client node itself or on the WAP. Then in decision process 414 a determination is made as to the predictability of available airtime. If the client node is a stationary HDTV for example, the local communications are likely to be very well defined and possibly periodic as successive portions of the downlink streaming video are buffered. If however the client node is a notebook computer or smart phone there may not be sufficient predictability as to available airtime, which may appear random in which case control returns to process 400 for the ongoing transport of exclusively local client communications. If, however, an affirmative determination is made as to the amount and periodicity of available airtime then control is passed to process 416. In process 416 neighboring client nodes are identified. Such identification may be made by the hybrid client node itself or by the WAP.

Next, for each identified neighboring client node a determination is made as to the estimated rate at which relayed data can be transferred to and from each neighboring client node and the WAP via the hybrid client node. Such a determination may be made for the first relay link between the WAP and the hybrid wireless client device using existing channel state information (CSI) for the local link between the hybrid client node and the WAP. The determination of channel state information for the second relay link between the hybrid client node and a given one of the neighboring client nodes may be made by monitoring the received signal strength indicia (RSSI) or channel "H" between the neighboring client node during "probe" requests by the neighboring client node, or during transmissions of uplink communications by that neighboring client node to the WAP over its existing WLAN connection. Next each neighboring client node's throughput requirements are estimated in process 420. This estimate may be easily made by the WAP in an embodiment of the invention and can also be made by the hybrid client node in another embodiment of the invention. The hybrid client node can also make a determination as to data throughput requirements of each neighboring client node by "sniffing" the uplink and downlink communication packets between the WAP and each neighboring client node and from the header information therein determining: data type, e.g. video, audio or data, quality of service (QOS) levels, and packet sizes. Next in process 422 relay candidates are identified. Relay candidates are those neighboring client nodes which are projected to experience improved throughput via a prospective set of relay links as compared with their current throughput via their direct link to the WAP.

Next in process 424 a determination is made as to whether any of the relay candidate nodes have data throughput requirements which will bottleneck local client communications on the hybrid client node. Those neighboring nodes are removed from the relay candidate list. Next in decision process 426 a determination is made as to whether any relay candidates remain. If not control returns to process 400 for the exclusive transport of local communications by the hybrid wireless node. If however, there are one or more relay candidates, then control passes to the block of hybrid operational processes 450 to set up the relay links.

In an embodiment of invention the above discussed hybrid eligibility processes may be accomplished exclusively on the hybrid wireless client node. In another embodiment of the invention portions of the hybrid eligibility processing may be performed cooperatively between the hybrid client node and the WAP or Cloud server without departing from the scope of the claimed invention.

Hybrid operation processing commences with process 452 in which the hybrid client node initiates an beacon with the same service set identifier (SSID) as the WAP and the same credential requirements as the WAP in the case of WPSK shared key. This Is accomplished without interruption of the local client communications on the hybrid client node. Next control is passed to process 454. In process 454 an association request by the relay candidate node is accepted by the hybrid wireless client, while other other association requests may be rejected. In an embodiment of the invention, the WAP may work cooperatively with the hybrid client node, by disassociating the relay candidate node thereby forcing it to re-associate with the hybrid client node. Next in process 456 the hybrid client node interlaces or multiplexes local client communications between the hybrid client node and the WAP with relayed communications between the WAP and the accepted relay candidate client nodes. The following process 458 may be implemented in an embodiment of the invention in which the hybrid client node includes more than one antenna and includes support for multi-user multiple-input multiple-output (MU-MIMO) communications. In process 458, the hybrid wireless client node established concurrent uplink to the WAP and a downlink to the accepted candidate relay client node. The uplink to the WAP may include local or relay communications. The downlink to the accepted relay client node includes relay communications thereto. This reduces the amount of airtime devoted to relayed communications overall. Next in decision process 460 a determination is made as to whether the hybrid communications, of both local and relay communication data are negatively impacting or constraining the local communication data. If they are then control passes to process 462 in which the hybrid relay client dissociates the relay client node and terminates the beacon. Next control returns to process 400 for the ongoing transport of exclusively local communications data between the hybrid client node and the WAP. If alternately in decision process 460 a determination is reached that local communications are not negatively impacted or constrained, then control returns to process 456 for the ongoing transport of hybrid communications by the hybrid wireless client node.

The components and processes disclosed herein may be implemented in software, hardware, firmware, or a combination thereof, without departing from the scope of the Claimed Invention.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A hybrid wireless station for wireless communications on a wireless local area network (WLAN) having a wireless access point (WAP) and associated wireless stations, and the hybrid wireless station comprising:
   at least one antenna;
   a plurality of shared and discrete components coupled to one another for form at least one transmit and receive chain coupled to the at least one antenna for wireless communications on a selected communication channel;
   a hybrid eligibility module coupled to the plurality of shared and discrete components to determine eligibility of the hybrid wireless station for one of a local mode dedicated to local communications between the hybrid wireless station and the WAP, and a hybrid mode interlacing both the local communications together with relayed communications between the WAP and an identified one of the wireless stations and with the hybrid mode eligibility determination based on both airtime availability on the hybrid wireless station together with additional airtime requirements for the relayed communications and wherein the hybrid wireless station estimates the additional airtime requirements by sniffing existing uplink and downlink communication packets between the WAP and the identified one of the wireless stations for information as to data throughput requirements of the identified one of the wireless stations; and
   a hybrid operation module coupled to the plurality of shared and discrete components and responsive to a determination of hybrid mode eligibility by the hybrid eligibility module to initiate a relay of subsequent communications between the WAP and the identified one of the wireless stations without interrupting the local communications.

2. The hybrid wireless station of claim 1, further comprising:
   the hybrid eligibility module coupled to the plurality of shared and discrete components to determine eligibility of the hybrid wireless station for one of a local mode dedicated to local communications between the hybrid wireless station and the WAP, and a hybrid mode interlacing both the local communications together with relayed communications between the WAP acid an identified one of the wireless stations and with the hybrid mode eligibility determination based on both airtime availability on the hybrid wireless station together with additional airtime requirements for the relayed communications and wherein the hybrid wireless station estimates the additional airtime requirements by sniffing packet header information as to at least one of data type or payload size on existing uplink and downlink communication packets between the WAP and the identified one of the wireless stations for information as to data throughput requirements of the identified one of the wireless stations.

3. A method for operating a hybrid wireless station on a wireless local area network (WLAN) including wireless stations associated with a wireless access point (WAP); and the method comprising:
   determining eligibility of the hybrid wireless station for one of a local mode dedicated to local communications between the hybrid wireless station and the WAP, and a hybrid mode interlacing both the local communications together with relayed communications between the WAP and an identified one of the associated wireless stations;

determining airtime availability on the hybrid wireless station;

sniffing uplink and downlink communication packets between the WAP and the identified one of the wireless stations, for information as to data throughput requirements of the identified one of the wireless stations;

estimating airtime requirements of the identified one of the wireless stations based on in sniffed in the sniffing act;

identifying the associated wireless station as a relay candidate based on the airtime availability of the hybrid wireless station and the airtime requirements of the identified one of the wireless stations; and responsive to a determination of hybrid mode eligibility in the determining act;

interlacing both the local communications together with the relayed communications.

4. The method for operating a hybrid wireless station of claim 3, wherein the sniffing and estimating acts further comprise:

sniffing uplink and downlink communication packet headers between the WAP and the identified one of the wireless stations, for information as to at least one of data type or payload size of said packets; and estimating airtime requirements of the identified one of the wireless stations based on information sniffed in the sniffing act.

\* \* \* \* \*